US012776026B2

(12) United States Patent
Dietrich et al.

(10) Patent No.: US 12,776,026 B2
(45) Date of Patent: Oct. 27, 2026

(54) COMPUTER-IMPLEMENTED METHOD AND TOOL FOR OPTICAL QUALITY CONTROL OF INTERMEDIATE OR END PRODUCTS OF PRODUCTION INSTALLATIONS, AND PRODUCTION INSTALLATION CONTROLLER

(71) Applicant: Siemens Aktiengesellschaft, Munich (DE)

(72) Inventors: Vincent Dietrich, Munich (DE); Kai Wurm, Munich (DE); Philipp Sebastian Schmitt, Munich (DE); Florian Wirnshofer, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 203 days.

(21) Appl. No.: 18/753,129

(22) Filed: Jun. 25, 2024

(65) Prior Publication Data

US 2025/0005740 A1 Jan. 2, 2025

(30) Foreign Application Priority Data

Jun. 27, 2023 (EP) .................................... 23181781

(51) Int. Cl.

*G06T 7/00* (2017.01)
*G05B 19/418* (2006.01)
*G06T 1/00* (2006.01)

(52) U.S. Cl.

CPC ........ *G06T 7/001* (2013.01); *G05B 19/41875* (2013.01); *G06T 1/0014* (2013.01); (Continued)

(58) Field of Classification Search

None
See application file for complete search history.

(56) References Cited

U.S. PATENT DOCUMENTS

| | | | |
|---|---|---|---|
| 2020/0184269 | A1 | 6/2020 | Sakai et al. |
| 2021/0012476 | A1 | 1/2021 | Miyazawa et al. |

(Continued)

FOREIGN PATENT DOCUMENTS

| | | | |
|---|---|---|---|
| CN | 115239621 | A | 10/2022 |
| JP | 10125749 | A | 5/1998 |

(Continued)

OTHER PUBLICATIONS

Kenichi Nakamura et al., •Reducing AI accuracy differences between digital twin images and real images using brightness conversion techniques,• DEIM Forum 2023, Mar. 9, 2023, pp. 1-8 (Summary).

*Primary Examiner* — Ryan A Jarrett
(74) *Attorney, Agent, or Firm* — Schmeiser Olsen PLLC

(57) ABSTRACT

For optical quality control, a product image of a production installation captured by an image capture device for given intrinsic and extrinsic parameters is used and digital twin data of a digital twin of the production installation are used, to render a synthetic simulation image based on the digital twin data, wherein the rendered synthetic simulation image is based on the same intrinsic and extrinsic parameters as during product image capture, to transfer the product image from a real domain into an artificial domain by a trained domain adaptation and in the process to generate a synthetic product image from the product image with domain transfer parameters obtained by the training, to compare the synthetic product image with the synthetic simulation image by a comparison operator, and to output a comparison result which qualitatively assesses the product.

12 Claims, 2 Drawing Sheets

Figure 1:
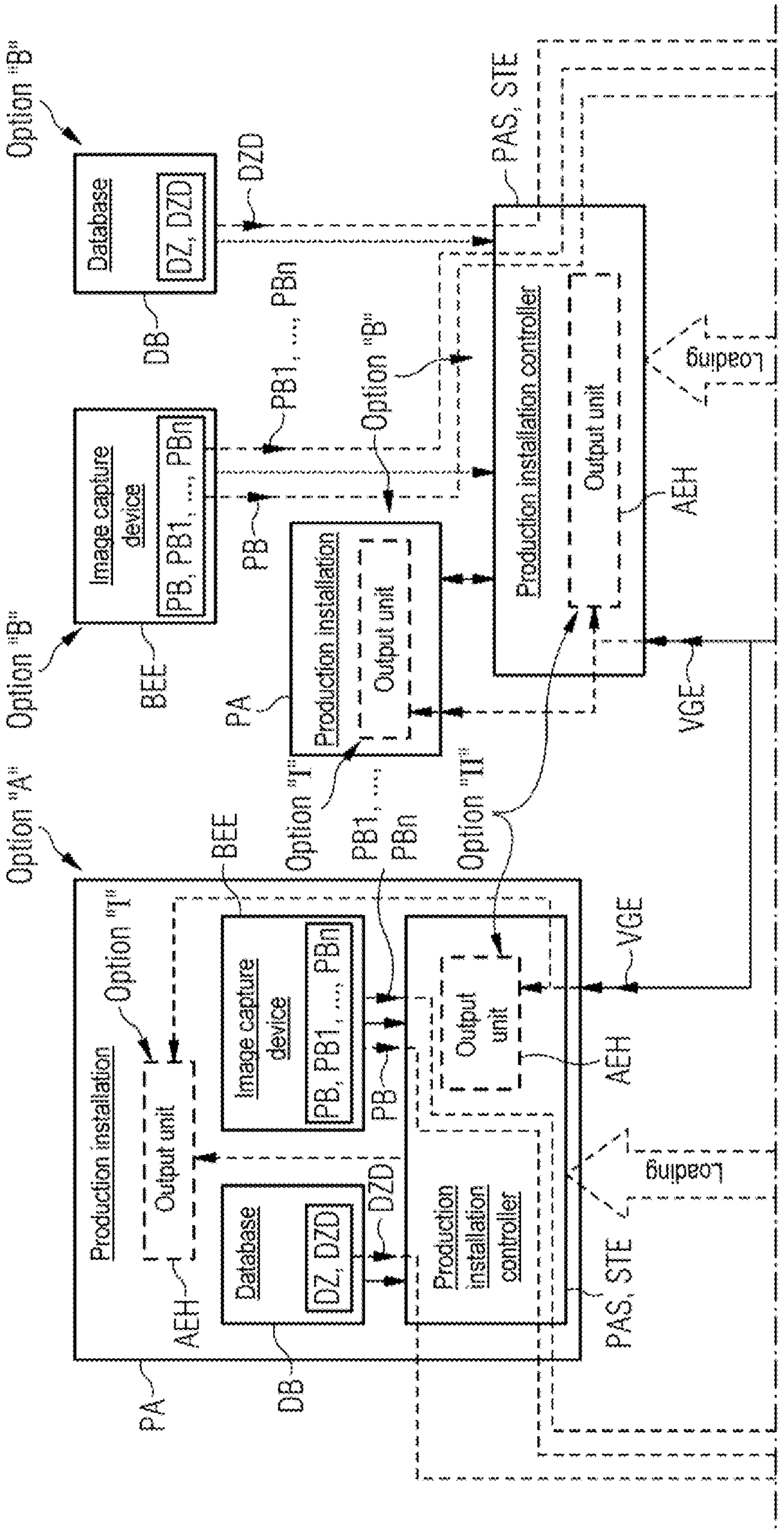
Figure 2:
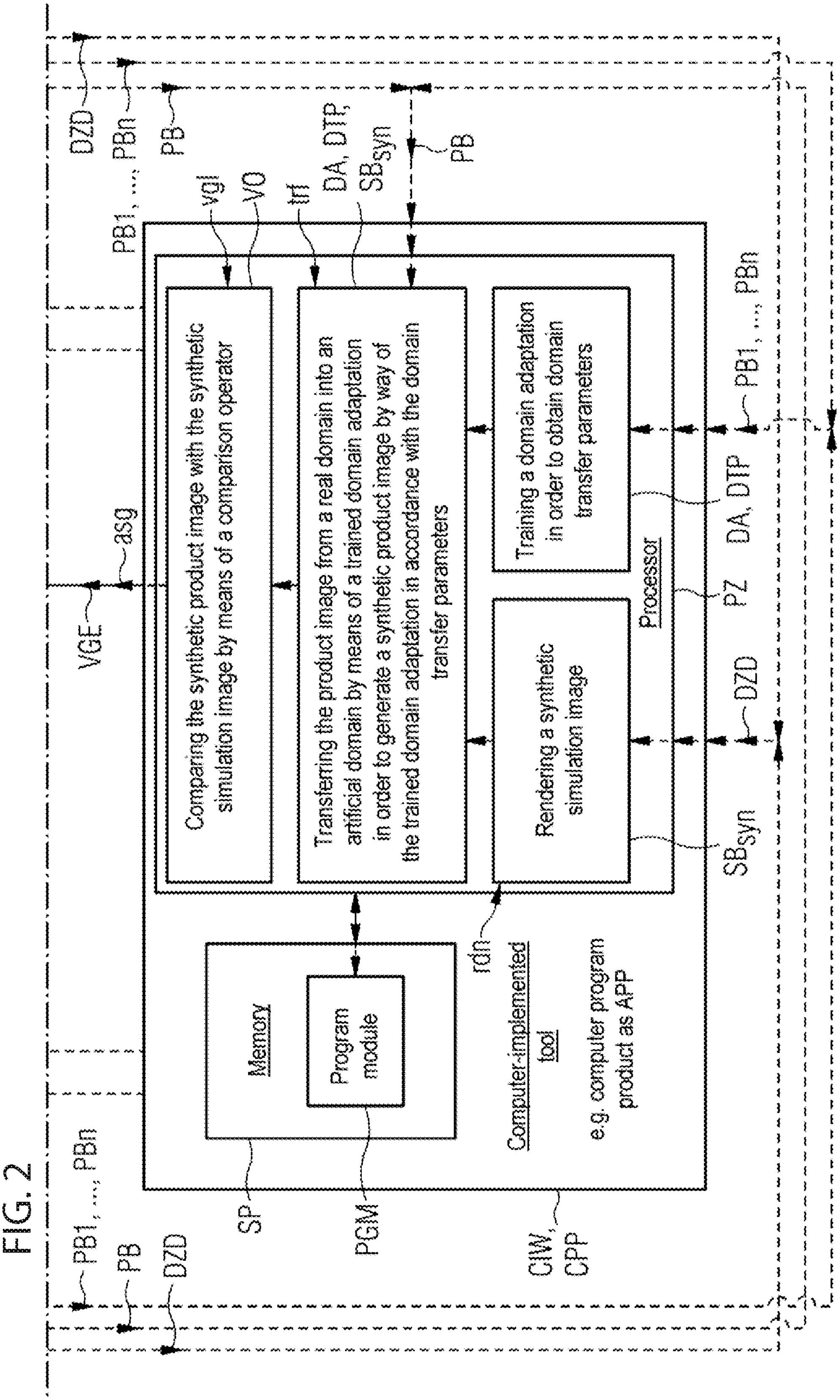

(52) U.S. Cl.
CPC .............. *G05B 2219/32335* (2013.01); *G05B 2219/32368* (2013.01); *G06T 2207/20081* (2013.01); *G06T 2207/20084* (2013.01)

(56) References Cited

U.S. PATENT DOCUMENTS

| | | | | |
|---|---|---|---|---|
| 2021/0311455 | A1 | 10/2021 | Sugaya | |
| 2022/0084175 | A1 | 3/2022 | Silverstein et al. | |
| 2022/0171907 | A1 | 6/2022 | Chang et al. | |
| 2022/0241978 | A1 | 8/2022 | Szarski et al. | |
| 2025/0363782 | A1 * | 11/2025 | Eggers .................. | G06V 10/82 |

FOREIGN PATENT DOCUMENTS

| | | | |
|---|---|---|---|
| JP | 2020095364 | A | 6/2020 |
| WO | 2019186915 | A1 | 10/2019 |
| WO | 2022269470 | A1 | 12/2022 |

* cited by examiner

COMPUTER-IMPLEMENTED METHOD AND TOOL FOR OPTICAL QUALITY CONTROL OF INTERMEDIATE OR END PRODUCTS OF PRODUCTION INSTALLATIONS, AND PRODUCTION INSTALLATION CONTROLLER

CROSS-REFERENCE TO RELATED APPLICATIONS

This application claims priority to EP application Ser. No. 23/181,781.8, having a filing date of Jun. 27, 2023, the entire contents of which are hereby incorporated by reference.

FIELD OF TECHNOLOGY

The following relates to a computer-implemented method for optical quality control of intermediate or end products of production installations, a computer-implemented tool for optical quality control of intermediate or end products of production installations, and a production installation controller.

BACKGROUND

Production processes of production installations, regardless of the field or domain wherein they proceed in a corresponding production installation, are never defect-free and have to be validated by often optical quality control. This applies in particular to automated production processes. During optical quality control, this involves recording an image of the product or of part of the product and using the image as a basis for calculating whether all the features satisfy the requirements. In this case, establishing the quality control is associated with engineering outlay, which is a hindrance particularly in the case of autonomous automated production installations in the industrial sphere, which ought to adapt to new products with minimal outlay.

One typical example of such a production process is assembling a product in the industrial sphere (industrial domain) by a robot system or automation system, wherein a universally usable automatic movement machine is used for executing handling, service and/or manufacturing tasks for assembly and where, e.g., after a joining process, it is necessary to check whether a component to be mounted was inserted at the correct location and has fully latched in place.

For this purpose, it is known to provide the commissioning engineer of the production installation, in particular of the robot system, with tools for defining the quality rules as simply as possible. For example, that specific optical features, such as e.g., circles, lines, patterns, in the optically captured image must be at specific positions or have specific dimensions. The commissioning engineer then checks these rules using a few sample images and adapts parameters until the desired reliability is attained.

SUMMARY

An aspect relates to a computer-implemented method and tool for optical quality control of intermediate or end products of production installations and also a production installation controller with which the outlay for establishing the quality control under constantly changing conditions and relationships at the production installations for the quality control can be reduced to a correspondingly adaptively matched use of the production installations.

The concept underlying embodiments of the invention as claimed is that for an optical quality control of intermediate or end products of a production installation, wherein a product image of the production installation (Pa) captured by an image capture device for given intrinsic and extrinsic parameters is used and digital twin data of a digital twin of the production installation (PA) are used, wherein the digital twin is synchronized with the production installation at the time of operation thereof, (i) a synthetic simulation image based on the digital twin data is rendered, wherein the rendered synthetic simulation image is based on the same intrinsic and extrinsic parameters as during product image capture, (ii) the product image is transferred from a real domain into an artificial domain by a trained domain adaptation and in the process a synthetic product image is generated from the product image with domain transfer parameters obtained by the training, (iii) the synthetic product image is compared with the synthetic simulation image by a comparison operator, and (iv) a comparison result which qualitatively assesses the product is output.

In comparison with traditional rule-based methods, embodiments of the invention pursue a fundamentally different approach that offers better scaling possibilities.

In this case, one essential aspect of embodiments of the invention, for the quality control, is the use of a domain transformation from a real image domain into an artificial image domain. This results in a simpler image comparison for recognizing image differences.

One development of embodiments of the invention consists in the domain adaptation being implemented as a "machine learning" model according to the principle of a "generative adversarial network <GAN>", wherein data are generated by the use of two competing artificial neural networks referred to as generator and discriminator, of which the generator generates artificial data which the discriminator checks on the basis of authentic data, e.g., captured with the aid of images, and wherein the two networks are logically and mathematically combined with one another in such a way that the artificial data generated by the generator seem more and more genuine and at the end the discriminator is no longer able to differentiate the genuine data from the authentic data.

Furthermore, it is advantageous if, the trained domain adaptation with the domain transfer parameters is implemented in a two-stage training with the following steps "S1" and "S2":

- "S1": generating a data set on the basis of a multiplicity "n" of image pairs which are formed from a captured product image and an associated synthetic simulation image in each case for uniformly given intrinsic and extrinsic parameters;
- "S2": training the transfer of product-image-related data to simulation-image-related data with the aid of the generated data set by way of learning methods such as e.g., "generative adversarial network <GAN>".

Furthermore, embodiments of the invention are distinguished by the fact that

- the comparison operator is configured in such a way that the comparison is implemented pixel by pixel.
- the production installation is a robot system or automation system with a universally usable automatic movement machine for executing handling, service and/or manufacturing tasks.

The basic scenario underlying embodiments of the invention shall be outlined below.

The starting point for the scenario to be outlined here is the prerequisite that a detailed digital twin of the production installation is present at the time of operation. The digital twin includes:

- geometries and/or textures of the used objects, robots and components of the production installation
- expected positions and orientations of the objects, moments and components of the production installation at the time of operation, i.e., at the given point in time This precondition is generally satisfied for autonomously acting production installations or systems, but it can also be satisfied or retrofitted for traditional production installations or systems.

Taking this as a departure point or on this basis, in accordance with the approach of embodiments of the invention, a genuine image of a part or product to be inspected, e.g., intermediate or end product, of the production installation is recorded and this image is transferred into an image space of a simulation with the aid of a domain adaptation. Furthermore, the transferred image is compared with a synthetically rendered image which has been generated with the aid of the digital twin. The "synthetic-looking" images now present in the same image space can now be examined for differences with the aid of a comparison operator. In this case, the output of a comparison result can be e.g., a quality result "OK" or not "OK".

The quality result can then be automatically taken into account in the further course of the process; by way of example, defectively produced products (e.g., intermediate or end products) can be automatically sorted out or else a user of the production installation can be called for assistance.

The approach of embodiments of the invention has two main stages:

1. Training for domain adaptation: This step creates the basis for transferring images from a real domain into an artificial domain. This is part of the domain adaptation. In this case, one possible, exemplary method of training for the domain adaptation is the "generative adversarial network <GAN>" technology already mentioned.

The training can be characterized as follows:

a. In a first step, a data set can be recorded from genuine images and associated synthetic images which, for the optical capture, each consist of the same perspective and the same parameters (extrinsic and intrinsic) of an image capture device, e.g., a camera.

The data recording and the training here can take place in the initial phase of the commissioning of the production installation and need only be implemented once for the production installation, depending on the variability of the products to be produced (intermediate or end products). In other words, renewed training would not be necessary in the event of a product change.

In this case, the data recording proceeds concomitantly during a test or start-up phase. In this case, at points with a need for quality control genuine images are recorded and stored and the camera parameters (intrinsic and extrinsic parameters of the image capture device) are likewise stored. As part of the data recording for the training, in addition, with the aid of the digital twin, the associated synthetic image is rendered from the same perspective and with the same parameters and is stored in the data set.

b. Finally, the training step ensues, wherein the transfer of real data to synthetic data is learned. By way of example, the "generative adversarial network <GAN>" technology already mentioned is again appropriate for this.

2. Production installation operation:

a. Bringing the image capture device into a suitable position in order that the product or component, the intermediate or end product, is visible. Suitable positions can be calculated at the time of operation of the production installation by way of heuristics. This applies in particular to an autonomous production installation.

b. Recording a product image.

c. Transforming the genuine product image into the image domain of a synthetic (simulated) image with the aid of domain adaptation, e.g., "generative adversarial network <GAN>" technology.

d. Rendering a synthetic image recorded in the digital twin from the same position with identical parameters (intrinsic and extrinsic parameters of the image capture device).

e. Comparing the images with the aid of a comparison operator. In an embodiment of the invention, a neural network can be used here, but traditional pixel-based methods are also suitable.

BRIEF DESCRIPTION

Some of the embodiments will be described in detail, with reference to the following figures, wherein like designations denote like members, wherein:

FIG. A shows a production installation PA with optical quality control for intermediate or end products of the production installation, which is usable in various technical fields (in technical domains) for product production by adequate methods and techniques, e.g., in factories, production lines and large apparatuses; and FIG. B shows a production installation PA with optical quality control for intermediate or end products of the production installation, which is usable in various technical fields (in technical domains) for product production by adequate methods and techniques, e.g., in factories, production lines and large apparatuses.

DETAILED DESCRIPTION

In a first embodiment variant of the invention for optical quality control of intermediate or end products in accordance with an option "A", the production installation PA contains a production installation controller PAS, a database DB, an image capture device BEE configured e.g., in the form and shape of a camera, and an output unit AEH. While the database DB and the image capture device BEE are connected to the production installation controller PAS for accesses thereof, the output unit AEH either in a first embodiment in accordance with option "I", like the database DB and the image capture device BEE, is connected to the production installation controller PAS for accesses thereof or in a second embodiment in accordance with option "II" is contained in the production installation controller PAS.

As an alternative to the first embodiment variant of the invention in accordance with option "A", in a second embodiment variant of the invention for optical quality control of intermediate or end products in accordance with an option "B", the production installation PA, the production installation controller PAS, the database DB and the image capture device BEE are not combined "under one roof", the roof of the production installation PA, rather they all function as separate units, wherein the production installation controller PAS is connected to the production installation PA, the database DB and the image capture device BEE for accesses, while the output unit AEH either in the first embodiment in accordance with option "I" is contained in the production installation PA for accesses of the production installation controller PAS or in the second embodiment in accordance with option "II" is contained in the production installation controller PAS.

Between these two "extreme" embodiment variants of the invention, other variants are also conceivable (not explicitly illustrated in FIGS. A and B where either only the database DB, the image capture device BEE or the production installation controller PAS is contained in the production installation PA or the production installation PA contains in each case two of the units mentioned.

In both illustrated embodiment variants in accordance with options "A" and "B", the production installation controller PAS is a control unit STE for a robot system or automation system with a universally usable automatic movement machine for executing handling, service and/or manufacturing tasks.

With regard to the illustrated embodiment variant in accordance with option "B", it is alternatively also possible for the production installation controller PAS to be a customary personal computer or controller.

The explanations below concerning the description of FIGS. A and B apply to both illustrated embodiment variants of the invention for optical quality control of intermediate or end products in accordance with options "A" and "B".

For this purpose

- the image capture device BEE captures both a product image PB of the production installation PA, which can concern an intermediate or end product, for given intrinsic and extrinsic parameters of the image capture device BEE and also product images PB1, . . . , PBn for uniformly given intrinsic and extrinsic parameters of the image capture device BEE for the purpose of generating a data set on the basis of a multiplicity "n" of image pairs.
- the database DB stores digital twin data DZD of a digital twin DZ of the production installation PA, wherein the digital twin DZ is synchronized with the production installation PA at the time of operation thereof.
- a computer-implemented tool CIW is used, which is a computer program product (non-transitory computer readable storage medium having instructions, which when executed by a processor, perform actions) CPP configured as an APP and is loadable into the production installation controller PAS for optical quality control for intermediate or end products of the production installation PA.

The computer-implemented tool CIW contains a non-volatile, readable memory SP, wherein processor-readable control program instructions of a program module PGM for optical quality control are stored, and a processor PZ connected to the memory SP, the processor executing the control program instructions of the program module PGM for optical quality control of the intermediate or end products of production installation PA.

For this purpose, the computer-implemented tool CIW uses

- the product image PB of the production installation PA captured by the image capture device BEE for given intrinsic and extrinsic parameters, and the product images PB1, . . . , PBn captured by the image capture device BEE for given intrinsic and extrinsic parameters for the purpose of generating the data set on the basis of a multiplicity "n" of image pairs,
- the digital twin data DZD of the digital twin DZ of the production installation PA that are stored in the database DB, wherein the digital twin DZ is synchronized with the production installation PA at the time of operation thereof.

During the loading of the computer-implemented tool CIW into the production installation controller PAS, these data are requested from the processor PZ as input data by access and then either collected or supplied.

The program module PGM of the computer-implemented tool CIW is constituted in such a way, and the processor PZ of the computer-implemented tool CIW that executes the control program instructions of the program module PGM for optical quality control is configured in such a way, that the following steps for optical quality control are carried out:

- rendering rdn a synthetic simulation image $SB_{syn}$ based on the digital twin data DZD. The rendered synthetic simulation image $SB_{syn}$ here is based on the same intrinsic and extrinsic parameters as during product image capture.
- transferring trf the product image PB from a real domain into an artificial domain by a trained trn domain adaptation DA.

The domain adaptation is e.g., implemented as a "machine learning" model according to the principle of a "generative adversarial network <GAN>", wherein data are generated by the use of two competing artificial neural networks referred to as generator and discriminator, of which the generator generates artificial data which the discriminator checks on the basis of authentic data, e.g., captured with the aid of images, and wherein the two networks are logically and mathematically combined with one another in such a way that the artificial data generated by the generator seem more and more genuine and at the end the discriminator is no longer able to differentiate the genuine data from the authentic data.

The domain adaptation DA contains domain transfer parameters DTP obtained by the training trn. The trained trn domain adaptation DA with the domain transfer parameters DTP is implemented in a two-stage training trn with the following steps "S1" and "S2"

- "S1": generating a data set on the basis of a multiplicity "n" of image pairs which are formed from the captured product images PB1, . . . , PBn and associated synthetic simulation image $SB1_{syn}$, . . . , $SBn_{syn}$ for uniformly given intrinsic and extrinsic parameters;
- "S2": training the transfer of product-image-related data to simulation-image-related data with the aid of the generated data set by way of learning methods such as e.g., "generative adversarial network <GAN>".

After the training, a synthetic product image $PB_{syn}$ is generated from the product image PB with the trained domain adaptation DA in accordance with the domain transfer parameters DTP. As a result, an image pair formed from the synthetic simulation image $SB_{syn}$ and the synthetic product image $PB_{syn}$ arises in an artificial image space for comparison purposes.

- comparing vgl the synthetic product image $PB_{syn}$ with the synthetic simulation image $SB_{syn}$ by a comparison operator VO. The comparison operator VO is e.g., configured in such a way that the comparison is implemented pixel by pixel.
- outputting asg a comparison result VGE which qualitatively assesses the product. This comparison result VGE is e.g., output asg by way of the output unit AEH of the production installation PA or the production installation controller PAS of the production installation PA.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for optical quality control of intermediate or end products of production installations, wherein for the quality control a product image of a production installation captured by an image capture device for given intrinsic and extrinsic parameters is used, digital twin data of a digital twin of the production installation are used, wherein the digital twin is synchronized with the production installation at the time of operation thereof, the method comprising:

wherein a) rendering a synthetic simulation image based on the digital twin data, wherein the rendered synthetic simulation image is based on the same intrinsic and extrinsic parameters as during product image capture;

b) transferring the product image from a real domain into an artificial domain by a trained domain adaptation which contains domain transfer parameters obtained by the training and with which a synthetic product image is generated from the product image in accordance with the domain transfer parameters, whereby an image pair formed from the synthetic simulation image and the synthetic product image arises in an artificial image space for comparison purposes;

c) comparing the synthetic product image with the synthetic simulation image by a comparison operator; and d) outputting a comparison result which qualitatively assesses the product, by way of an output unit of the production installation or a production installation controller of the production installation.

2. The computer-implemented method as claimed in claim 1, wherein the domain adaptation is implemented as a machine learning model according to the principle of a generative adversarial network (GAN), wherein data are generated by the use of two competing artificial neural networks referred to as generator and discriminator, of which the generator generates artificial data which the discriminator checks on the basis of authentic data, captured with the aid of images, and wherein the two networks are logically and mathematically combined with one another in such a way that the artificial data generated by the generator seem more and more genuine and at the end the discriminator is no longer able to differentiate the genuine data from the authentic data.

3. The computer-implemented method as claimed in claim 1, wherein the trained domain adaptation with the domain transfer parameters is implemented in a two-stage training with the following steps S1 and S2

S1: generating a data set on the basis of a multiplicity n of image pairs which are formed from captured product images and associated synthetic simulation images for uniformly given intrinsic and extrinsic parameters;

S2: training the transfer of product-image-related data to simulation-image-related data with the aid of the generated data set by way of learning methods.

4. The computer-implemented method as claimed in claim 1, wherein the comparison operator is configured in such a way that the comparison is implemented pixel by pixel.

5. The computer-implemented method as claimed in claim 1, wherein the production installation is a robot system or automation system with a universally usable automatic movement machine for executing handling, service and/or manufacturing tasks.

6. A computer-implemented tool, configured as an APP, for optical quality control of intermediate or end products of production installations, wherein for the quality control a product image of a production installation captured by an image capture device for given intrinsic and extrinsic parameters is used, digital twin data of a digital twin of the production installation are used, wherein the digital twin is synchronized with the production installation at the time of operation thereof, wherein a non-volatile, readable memory, wherein processor-readable control program instructions of a program module for optical quality control are stored, and a processor connected to the memory, the processor executing the control program instructions of the program module for optical quality control of the intermediate or end products of production installations, wherein the program module is constituted in such a way, and the processor that executes the control program instructions of the program module for optical quality control is configured in such a way, that a) a synthetic simulation image based on the digital twin data is rendered, wherein the rendered synthetic simulation image is based on the same intrinsic and extrinsic parameters as during product image capture, b) the product image is transferred from a real domain into an artificial domain by a trained domain adaptation which contains domain transfer parameters obtained by the training and with which a synthetic product image is generated from the product image in accordance with the domain transfer parameters, whereby an image pair formed from the synthetic simulation image and the synthetic product image arises in an artificial image space for comparison purposes, c) the synthetic product image is compared with the synthetic simulation image by a comparison operator; and d) a comparison result which qualitatively assesses the product is output, by way of an output unit of the production installation or a production installation controller of the production installation.

7. The computer-implemented tool as claimed in claim 6, wherein the processor and the program module for optical quality control are configured in such a way that the domain adaptation is implemented as a machine learning model according to the principle of a generative adversarial network (GAN), wherein data are generated by the use of two competing artificial neural networks referred to as generator and discriminator, of which the generator generates artificial data which the discriminator checks on the basis of authentic data, captured with the aid of images, and wherein the two networks are logically and mathematically combined with one another in such a way that the artificial data generated by the generator seem more and more genuine and at the end the discriminator is no longer able to differentiate the genuine data from the authentic data.

8. The computer-implemented tool as claimed in claim 6, wherein the processor and the program module for optical quality control are configured in such a way that the trained domain adaptation with the domain transfer parameters is implemented in a two-stage training with the following steps S1 and S2

S1: generating a data set on the basis of a multiplicity n of image pairs which are formed from captured product images and associated synthetic simulation images for uniformly given intrinsic and extrinsic parameters;

S2: training the transfer of product-image-related data to simulation-image-related data with the aid of the generated data set by way of learning methods.

9. The computer-implemented tool as claimed in claim 6, wherein the processor and the program module for optical quality control and also the comparison operator are configured in such a way that the comparison is implemented pixel by pixel.

10. The computer-implemented tool as claimed in claim 6, wherein the production installation is a robot system or automation system with a universally usable automatic movement machine for executing handling, service and/or manufacturing tasks.

11. A production installation controller for optical quality control of intermediate or end products of a production installation, comprising:

an image capture device which captures a product image of the production installation for given intrinsic and extrinsic parameters either is part of the production installation and as such is connected to the production installation controller or is assigned to the production installation and as such is connected to the production installation controller, a database which stores digital twin data of a digital twin of the production installation is assigned to the production installation and as such is connected to the production installation controller, wherein the digital twin is synchronized with the production installation at the time of operation thereof wherein a computer-implemented tool as claimed in claim 6, which is loadable into the production installation controller in order to implement a method for optical quality control of intermediate or end products of production installations.

12. The production installation controller as claimed in claim 11, wherein a control unit for a robot system or automation system with a universally usable automatic movement machine for executing handling, service and/or manufacturing tasks.

* * * * *